Patented Nov. 7, 1950

2,528,710

UNITED STATES PATENT OFFICE 2,528,710

POLYMERIZATION OF ACRYLONITRILE TO WHITE POLYMERS IN DIMETHYL FORMAMIDE

John Cadwallader Richards, Urbana, Ill., assignor to E. I. du Pont de Nemours & Company, Wilmington, Del., a corporation of Delaware No Drawing. Application December 19, 1946, Serial No. 717,327

16 Claims. (Cl. 260—32.6)

This invention relates to the polymerization of acrylonitrile and more particularly to the polymerization of acrylonitrile in a medium which is a solvent for the polymer formed.

Using previously known methods, it is necessary, in producing spinning solutions of polyacrylonitrile or its copolymers, to form the polymer first in emulsion or solution polymerization processes, and then to separate the polymeric material from the reaction mixture, and finally process the polymer by washing and drying. After completion of these steps, the polymer must be dissolved under critical conditions of temperature and time in order to obtain a solution of the polymer having the proper viscosity and capable of being extruded. The complete process involves considerable consumption of time and materials. While the description below is made in particular reference to the polymerization of acrylonitrile, it is to be understood that the invention is also applicable to the polymerization of acrylonitrile in the presence of copolymerizable monomers, such as styrene, methyl vinyl ketone, methacrylic acid and the like.

Accordingly, this invention has as an object the provision of new spinning solutions of acrylonitrile polymers and the preparation of these solutions by a process involving a minimum number of steps. A further object is the provision of a new process for the polymerization of acrylonitrile. Another object is the provision of a process for the polymerization of acrylonitrile in a solvent for the polymer to be formed. A still further object is the provision of a new catalyst for the polymerization of acrylonitrile. Other objects will appear hereinafter.

These objects are accomplished by the following invention in which acrylonitrile is polymerized in the presence of a solvent for the polymer to be formed, such as dimethyl formamide. The polymerization is catalyzed by a boron trifluoride-dimethyl formamide complex. The solid complex is obtained readily by passing gaseous boron trifluoride into dimethyl formamide. The complex forms very rapidly and precipitates. After filtration, it is ready for immediate use. A solution of acrylonitrile in dimethyl formamide is placed in an appropriate reaction vessel, and the complex is added to the dimethyl formamide solution of acrylonitrile in a concentration of 0.1% to 5.0% based on the amount of monomeric acrylonitrile present. The temperature of the polymerization medium is kept preferably at about between 60° C. and 80° C. for about one to twenty hours. As the polymerization of the acrylonitrile proceeds under the catalytic action of the boron trifluoride-dimethyl formamide complex, the polymer formed precipitates in the form of evenly-dispersed, highly-swollen particles. The reaction is preferably carried out using a considerable excess of monomer, and the precipitation occurs because the system of monomeric acrylonitrile and dimethyl formamide is not a good solvent for polyacrylonitrile. The mixture is heated at about 100° C. to drive off unchanged acrylonitrile. During this treatment, the polymer goes back into solution in the dimethyl formamide. Normally, the catalyst of this invention is not removed, and the resultant solutions of polyacrylonitrile are then used directly for extrusion in spinning processes.

The following tabulated examples, in which parts, proportions and percentages are by weight unless otherwise specified, illustrate the preferred methods for preparing solutions of polymeric acrylonitrile in dimethyl formamide. These examples are not to be construed as limitative. The following procedure was used.

Several solutions containing 50 parts of dimethyl formamide, 50 parts of acrylonitrile and an amount of the boron trifluoride-dimethyl formamide complex as shown in the table below were maintained at varying temperatures for different lengths of time. Ultra-violet light was used to accelerate the polymerization in the last two examples. As the reaction proceeded, the solutions gelled. At the end of the reaction time (see below), the gels were heated to 100° C. to drive off the unchanged acrylonitrile. In all examples clear, viscous solutions of polyacrylonitrile were formed which were extruded to form shaped articles. The following table also shows the characteristics of the polymer solutions obtained under varying conditions of catalyst concentration, time, temperature and exposure to ultra-violet light.

| Example | Catalyst, wt. | Reaction Temp., °C. | Reaction Time, Hours | Polymer, wt. | Yield, % | Solution Concentration, % |
|---|---|---|---|---|---|---|
| #1 | 1.0 | 70 | 3.5 | 7.7 | 15.0 | 13.1 |
| #2 | 1.5 | 76 | 3.0 | 15.0 | 30.0 | 22.6 |
| #3 | 1.0 | 50 | 20.0 | 3.2 | 6.4 | 5.9 |
| #4 | 1.0 | 85 | 2.0 | 5.1 | 10.2 | 9.1 |
| #5 | [1] 1.0 | 50 | 2.0 | 6.0 | 12.0 | 10.5 |
| #6 | [1] 1.0 | 50 | 5.0 | 15.5 | 31.0 | 23.3 |

[1] Ultra violet light.

The products of this invention are solutions of polyacrylonitrile in dimethyl formamide or other appropriate solvents. In the solutions are small amounts of a boron trifluoride-dimethyl formamide complex. The solutions contain from about 5% to 25% of polyacrylonitrile, the molecular weight of which is within the range of 15,000 to 250,000 or higher, as calculated from viscosity measurements by the Staudinger equation.

$$\text{Molecular weight} = \frac{N_{sp}}{K_m C}$$

wherein $K_m = 1.5 \times 10^{-4}$ $N_{sp} = \text{specific viscosity} = \frac{\text{viscosity of solution}}{\text{viscosity of solvent}} - 1$ and $C$ = concentration of the solution expressed as the number of moles of the monomer (calculated) per liter of solution.

The viscosities of the solutions vary from 15 to 750 poises and are workable at spinning temperatures of the order of 100° C. to 150° C. When the polymer has a molecular weight of 250,000 or more, the maximum concentration of polymer in the spinning solution must be of the order of 10%. However, since it is economically undesirable to use such large amounts of solvents for the spinning of a given amount of polymer, it is preferred to employ a polymer having an average molecular weight of between 40,000 and 150,000. Such a polymer forms a solution of the desired viscosity at a concentration of the order of 10% to 25% and at a desirable spinning temperature of the order of 100° C. to 150° C.

While the examples in the above table involved the use of equal parts (50) of dimethyl formamide and acrylonitrile, the invention is not limited to this distribution. The quantity of dimethyl formamide or of the particular solvent employed may far exceed that of the acrylonitrile. Likewise, and preferably, the acrylonitrile may be used in an excess. However, it is desirable to employ sufficient solvent so that a solution of the polymer is formed upon removing the unchanged acrylonitrile. Additional dimethyl formamide may be added, if necessary. The acrylonitrile is recovered by distillation usually at atmospheric pressure, but reduced pressure may be employed. The recovered monomer may be used again in the process of this invention without further purification.

Common solvents such as water, acetone and acetonitrile are not operable in this invention. Likewise, tetramethylene sulfone, which is a solvent for polyacrylonitrile, is ineffective when used as the solvent instead of dimethyl formamide. It appears that an amount of dimethyl formamide or its equivalent over and above that needed for the formation of the complex is required. It is possible to use a mixture of dimethyl formamide and other solvents for polyacrylonitrile providing the presence of the additional solvents does not lead to an inhibition of the catalytic effect of the complex. Other solvents for acrylonitrile polymers are disclosed in Latham, U. S. 2,404,714.

The catalyst complex may be used in concentrations of from 0.1% to 5.0% based on the amount of monomer used. The operating limits for the catalysts of this invention are generally the same as those observed using the activated-persulfate catalyst in the ordinary solution polymerization of acrylonitrile. The speed of polymerization and the molecular weight of polymer vary with the amount of catalyst used. Amounts of catalyst in the upper limits of the range given will produce low molecular weight polymer; higher molecular weight polymer is obtained when amounts of catalyst in the lower limits of the range are employed. If desired, other catalysts, for example, benzoyl peroxide, may be used in this invention with the boron trifluoride-dimethyl formamide complex.

For purposes of control it is simplest to add the boron trifluoride-dimethyl formamide complex as a solid to acrylonitrile dissolved in dimethyl formamide. The solid complex can be obtained by passing gaseous boron trifluoride into a container of dimethyl formamide that is jacketed to absorb the heat of reaction. The complex forms very rapidly and settles out of solution. It can be readily separated by filtration and is ready for immediate use. Accurately weighed portions of the complex can be easily added to the dimethyl formamide solution of acrylonitrile when it is desired to start the polymerization reaction.

It is also possible to pass gaseous boron trifluoride directly into a solution of acrylonitrile in dimethyl formamide and thereby initiate polymerization. This must be done carefully, however, because of the rapidity with which the complex is formed and because of the exothermic nature of the reaction. Care must also be taken to restrict the amount of catalyst to the desired amount which normally is a concentration of 0.1% to 5.0% based on the amount of monomer. It is difficult to determine accurately the amount of catalyst formed in situ by this method. Accordingly, the preferred method is to use the catalyst in the form of the solid complex as previously outlined.

No attempt is made to remove the catalyst of this invention from the spinning solution. The catalyst has no apparent detrimental effect upon the shaped articles formed from such solutions, as is generally true for other catalysts. Surprisingly, the yarns containing the complex in small amounts possess little or no undesirable color as do those prepared from the normal polyacrylonitrile spinning solutions. Since a white yarn is of considerable value in the textile field, this represents a definite advantage, and the catalyst is permitted to remain in the polymer. The catalyst or complex is substantially white. As can be seen in the above table the solutions may contain from 1 part of catalyst per 3.2 parts of polymer to 1 part of catalyst per 15.5 parts of polymer depending upon the yield of polymer obtained. The complex, therefore, may constitute from about 0.5% to about 25.0% of the total solids in solution. In preparing the white yarns referred to above, the usual spinning methods may be employed. However, it is preferred to carry out the spinning in such a manner that the yarns contain from about 1% to about 10% of the solid complex.

The temperatures at which the polymerization may be carried out may be varied between wide limits, as for example, between 30° C. and 150° C., using appropriate reaction vessels. While higher and lower temperatures may be employed, it has been found that the preferred temperature range is between 60° C. and 80° C. The temperature is generally varied as desired within these limits to suit the individual operation.

The time of reaction is largely dependent on the temperature of reaction and the concentration of catalyst. By varying these conditions, a good yield of polymer can be obtained in from one to twenty hours or even longer if desired.

Ultra-violet light may be used to accelerate the polymerization reaction and to reduce considerably the length of time necessary for completion of polymerization. The molecular weight of the polyacrylonitrile obtained is dependent on such factors as concentration of the monomer in dimethyl formamide, the temperature of reaction, the time of reaction, etc., and these factors may be adjusted to produce a polymer of the desired molecular weight.

Solution of polyacrylonitrile prepared by this process may be spun by the ordinary dry or wet-spinning processes known to those skilled in the art. The various factors, such as cell-dimensions, evaporative or coagulative medium, temperature, spinning speed, etc. may be varied within wide limits, the determining factor being the proper release of solvent to allow solidification in filament form. The filaments may then be subjected to a stretching operation, if desired, either while they are still in the gel state or after solidification is complete. The threads so formed may be treated or otherwise subjected to all the known processes in use in the textile art.

The advantages of this invention are obvious. A new and useful catalyst is provided for the polymerization of acrylonitrile. The catalyst of this invention (boron trifluoride-dimethyl formamide complex) is very unusual in that neither of the components have the ability to catalyze the polymerization of acrylonitrile when used separately. This is unusual since in the polymerization of olefins, for example, boron trifluoride catalyzes the reaction without the use of an added component. Further, acrylonitrile in the ordinary liquids used for solution or emulsion polymerization is not normally affected by metallic halide catalysts. Since neither boron trifluoride nor the complex catalyzes mass-polymerization of acrylonitrile or ordinary solution-polymerization when acrylonitrile is dissolved in common solvents such as water, acetone, acetonitrile, etc., it is unexpected that such a catalyst would cause the polymerization of acrylonitrile dissolved in a solvent such as dimethyl formamide.

Another advantage of this invention is the provision of a process whereby monomeric acrylonitrile can be polymerized in a solvent for the polymer so that an extrusion or spinning solution can be prepared directly. Operational steps are decreased in number with attendant economic advantages. Another advantage is the provision of new spinning solutions. Furthermore, the presence of the catalyst in the novel solutions of this invention leads to the production of a yarn whiter than that obtainable by former methods. The polymerization catalysts for acrylonitrile disclosed by the prior art are removed from the polymer prior to its use, but this invention makes such a step unnecessary, the new spinning compositions being capable for immediate use.

By use of the catalyst and process of this invention, the monomeric acrylonitrile is polymerized in a suitable solvent to yield a solution capable of immediate extrusion without going through such steps as separating, washing, drying, and grinding the polymerizate, and dissolving the polymerizate to form a spinning solution as required by emulsion polymerization processes. Thus, this invention provides a convenient and economical process for combining in one operation the several intermediate steps of previously known polymerization methods.

Since it is obvious that many changes and modifications can be made in the above-described details without departing from the nature and spirit of the invention, it is to be understood that the invention is not to be limited to the said details except as set forth in the appended claims.

I claim:

1. A process for the polymerization of acrylonitrile which comprises dissolving the said acrylonitrile in dimethyl formamide and adding from 0.1% to 5.0%, based on the acrylonitrile, of a borontrifluoride-dimethyl formamide complex, the said complex catalyzing the polymerization of the said acrylonitrile.

2. A process for the polymerization of acrylonitrile which comprises dissolving the said acrylonitrile in dimethyl formamide; adding from 0.1% to 5.0%, based on the acrylonitrile, of a boron trifluoride-dimethyl formamide complex, the said complex catalyzing the polymerization of the said acrylonitrile; heating the resultant mixture at 60° C. to 80° C. for one to twenty hours; and removing unchanged acrylonitrile.

3. A process for the polymerization of acrylonitrile which comprises dissolving the said acrylonitrile in dimethyl formamide; adding from 0.1% to 5.0%, based on the acrylonitrile, of a boron trifluoride-dimethyl formamide complex, the said complex catalyzing the polymerization of the said acrylonitrile; heating the resultant mixture at 60° C. to 80° C. for one to twenty hours; and removing unchanged acrylonitrile, thereby forming a solution of polyacrylonitrile in the said dimethyl formamide.

4. A process for the polymerization of acrylonitrile which comprises dissolving the said acrylonitrile in dimethyl formamide; passing into the resultant solution gaseous boron trifluoride to form from 0.1% to 5.0%, based on the acrylonitrile, of a boron trifluoride-dimethyl formamide complex in admixture with dimethyl formamide and acrylonitrile, thereby initiating the polymerization of the said acrylonitrile; heating the resultant polymerizing medium at 60° C. to 80° C. for one to twenty hours; and removing unchanged acrylonitrile, thereby forming a solution of polyacrylonitrile in the said dimethyl formamide.

5. A process for the polymerization of acrylonitrile which comprises dissolving the said acrylonitrile in dimethyl formamide; passing into the resultant solution gaseous boron trifluoride to form thereby, in admixture with dimethyl formamide and acrylonitrile, from 0.1% to 5.0%, based on the acrylonitrile, of a boron trifluoride-dimethyl formamide complex and initiating the polymerization of the said acrylonitrile; heating the resultant polymerizing medium at 60° C. to 80° C. for one to twenty hours; and removing unchanged acrylonitrile, thereby forming a solution of polyacrylonitrile in the said dimethyl formamide.

6. In polymerizations of acrylonitrile in the presence of excess dimethyl formamide, the process comprising initiating the said polymerizations with from 0.1% to 5.0%, based on the acrylonitrile, of a boron trifluoride-dimethyl formamide complex.

7. As a new composition of matter, poly acrylonitrile, dimethyl formamide, and from about 0.5% to about 25%, based upon the total solids, of a boron trifluoride-dimethyl formamide complex.

8. As a new composition of matter, a polymer of acrylonitrile dissolved in a solvent comprising dimethyl formamide containing from about 0.5% to about 25% of a boron trifluoride-dimethyl formamide complex based upon the total solids in solution.

9. As a new composition of matter, yarns of polyacrylonitrile containing a boron trifluoride-dimethyl formamide complex.

10. As a new composition of matter, yarns of polyacrylonitrile containing from about 0.5% to about 25.0% of from about 1.0% to about 10.0% of a boron trifluoride-dimethyl formamide complex based on the polyacrylonitrile.

11. As a new composition of matter, yarns of polyacrylonitrile containing from about 1.0% to about 10.0% of a boron trifluoride-dimethyl formamide complex based on the polyacrylonitrile, the said yarns being substantially white.

12. A process comprising the polymerization of acrylonitrile in the presence of dimethyl formamide and from 0.1% to 5.0%, based on the acrylonitrile, of a boron trifluoride-dimethyl formamide complex.

13. As a new composition of matter, an acrylonitrile polymer, dimethyl formamide and from about 0.5% to about 25% of a boron trifluoride-dimethyl formamide complex.

14. As a new composition of matter, a yarn of an acrylonitrile polymer, said yarn containing from about 0.5% to about 25% of a boron trifluoride-dimethyl formamide complex.

15. As a new composition of matter, a yarn of an acrylonitrile polymer, said yarn containing from about 1.0% to about 10.0% of a boron trifluoride-dimethyl formamide complex based on the said yarn.

16. As a new composition of matter, a yarn of an acrylonitrile polymer, said yarn containing from about 1.0% to about 10.0% of a boron trifluoride-dimethyl formamide complex based on the said yarn, the said yarn being substantially white.

JOHN CADWALLADER RICHARDS.

REFERENCES CITED

The following references are of record in the file of this patent:

UNITED STATES PATENTS

| Number | Name | Date |
|---|---|---|
| 2,097,586 | Crawford | Nov. 2, 1937 |
| 2,416,607 | Bacon | Feb. 25, 1947 |
| 2,432,447 | Scheiderbauer | Dec. 9, 1947 |

OTHER REFERENCES

Sowa et al., J. A. C. S., vol. 55, pages 5052–5053 (1933).

Sowa et al., J. A. C. S., vol. 59, pages 1202–1203 (1937).

Certificate of Correction

Patent No. 2,528,710            November 7, 1950

JOHN CADWALLADER RICHARDS

It is hereby certified that error appears in the printed specification of the above numbered patent requiring correction as follows:

Column 5, line 11, for the word "Solution" read *Solutions*; column 6, lines 68 and 69, for "poly acrylonitrile" read *polyacrylonitrile*; column 7, line 4, after "containing" insert *from about 0.5% to about 25.0% of*; column 7, lines 7 and 8, strike out "from about 0.5% to about 25.0% of";

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*